(12) United States Patent
Lambert et al.

(10) Patent No.: US 8,510,560 B1
(45) Date of Patent: Aug. 13, 2013

(54) EFFICIENT KEY ESTABLISHMENT FOR WIRELESS NETWORKS

(75) Inventors: Paul A. Lambert, Mountain View, CA (US); Frank Huang, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 293 days.

(21) Appl. No.: 12/541,731

(22) Filed: Aug. 14, 2009

Related U.S. Application Data (60) Provisional application No. 61/090,376, filed on Aug. 20, 2008, provisional application No. 61/090,380, filed on Aug. 20, 2008.

(51) Int. Cl.
*H04L 9/00* (2006.01)

(52) U.S. Cl.
USPC ............ 713/171; 713/168; 713/170; 380/44; 380/277; 726/4

(58) Field of Classification Search
USPC ................... 713/171, 168, 170; 380/44, 277; 726/4
See application file for complete search history.

(56) References Cited

U.S. PATENT DOCUMENTS

| | | | |
|---|---|---|---|
| 5,390,165 A | 2/1995 | Tuch | |
| 5,481,733 A | 1/1996 | Douglis et al. | |
| 5,617,118 A | 4/1997 | Thompson | |
| 5,673,416 A | 9/1997 | Chee et al. | |
| 5,771,356 A | 6/1998 | Leger et al. | |
| 5,828,835 A | 10/1998 | Isfeld et al. | |
| 5,884,099 A | 3/1999 | Klingelhofer | |
| 6,014,722 A | 1/2000 | Rudin et al. | |
| 6,092,108 A | 7/2000 | DiPlacido et al. | |
| 6,230,277 B1 | 5/2001 | Nakaoka et al. | |
| 6,330,626 B1 | 12/2001 | Dennin et al. | |
| 6,463,509 B1 | 10/2002 | Teoman et al. | |
| 6,564,318 B1 | 5/2003 | Gharda et al. | |
| 6,601,167 B1 | 7/2003 | Gibson et al. | |
| 6,711,447 B1 | 3/2004 | Saeed | |
| 6,756,988 B1 | 6/2004 | Wang et al. | |
| 6,823,472 B1 | 11/2004 | DeKoning et al. | |
| 6,832,280 B2 | 12/2004 | Malik et al. | |
| 7,089,419 B2 | 8/2006 | Foster et al. | |
| 7,103,788 B1 | 9/2006 | Souza et al. | |
| 7,126,913 B1 | 10/2006 | Patel et al. | |

(Continued)

FOREIGN PATENT DOCUMENTS

| | | |
|---|---|---|
| EP | 1847911 | 10/2007 |
| JP | 08076872 | 3/1996 |

(Continued)

OTHER PUBLICATIONS

"Part 11—Wireless LAN Medium Access Control (MAC) and Physical Layer (PHY) Specifications", Information Technology—Telecommunications & Information Exchange Between Systems . . . International Standard, ISO/IEC 8802-11:1999(E), First Ed., pp. 1-531, 1999.

(Continued)

*Primary Examiner* — Edward Zee
*Assistant Examiner* — Baotran N To (57) ABSTRACT

A method and apparatus for deriving an encryption key for use between two stations in a wireless network using information intrinsic to one of the stations, without exchanging pairwise transient keys.

14 Claims, 7 Drawing Sheets

(56) References Cited

U.S. PATENT DOCUMENTS

| | | |
|---|---|---|
| 7,194,638 B1 | 3/2007 | Larky |
| 7,266,842 B2 | 9/2007 | Foster et al. |
| 7,299,365 B2 | 11/2007 | Evans |
| 7,308,591 B2 | 12/2007 | Dubinsky |
| 7,356,707 B2 | 4/2008 | Foster et al. |
| 7,496,952 B2 | 2/2009 | Edwards et al. |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,774,635 B2 | 8/2010 | Shiota |
| 7,788,670 B2 | 8/2010 | Bodas et al. |
| 7,818,389 B1 | 10/2010 | Chiang et al. |
| 7,873,841 B2 | 1/2011 | Mullis, II et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,095,816 B1 | 1/2012 | Chan |
| 8,139,521 B2 | 3/2012 | Mukherjee et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,443,187 B1 | 5/2013 | Orr |
| 8,443,211 B2 | 5/2013 | Zhao et al. |
| 2002/0069354 A1 | 6/2002 | Fallon et al. |
| 2002/0087816 A1 | 7/2002 | Atkinson et al. |
| 2003/0014368 A1 | 1/2003 | Leurig et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0125679 A1 | 7/2004 | Kwean |
| 2004/0266386 A1 | 12/2004 | Kuo |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0138365 A1 | 6/2005 | Bellipady et al. |
| 2005/0156925 A1 | 7/2005 | Fong et al. |
| 2006/0072748 A1 | 4/2006 | Buer |
| 2006/0075259 A1 | 4/2006 | Bajikar et al. |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2007/0005824 A1 | 1/2007 | Howard |
| 2007/0011445 A1 | 1/2007 | Waltermann et al. |
| 2007/0038866 A1 | 2/2007 | Bardsley et al. |
| 2007/0097904 A1 | 5/2007 | Mukherjee et al. |
| 2007/0234028 A1 | 10/2007 | Rothman et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0046732 A1* | 2/2008 | Fu et al. .................. 713/171 |
| 2008/0066075 A1 | 3/2008 | Nutter et al. |
| 2008/0072311 A1 | 3/2008 | Mullick et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0298289 A1 | 12/2008 | Jeyaseelan |
| 2008/0313462 A1* | 12/2008 | Zhao et al. .................. 713/170 |
| 2009/0006658 A1 | 1/2009 | Gough |
| 2009/0049222 A1 | 2/2009 | Lee et al. |
| 2009/0199031 A1 | 8/2009 | Zhang |
| 2010/0023747 A1 | 1/2010 | Asnaashari et al. |
| 2010/0058045 A1 | 3/2010 | Borras et al. |
| 2010/0070751 A1 | 3/2010 | Chue |
| 2010/0174934 A1 | 7/2010 | Zhao |
| 2013/0046966 A1 | 2/2013 | Chu |

FOREIGN PATENT DOCUMENTS

| | | |
|---|---|---|
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |

OTHER PUBLICATIONS

"Extensions to Direct Link Setup (DLS) Comments", IEEE, P802.11z, pp. 1-3, Jul. 2009.

"Final Office Action", U.S. Appl. No. 12/098,254, (May 18, 2011), 11 pages.

"Final Office Action", U.S. Appl. No. 12/178,268, (May 25, 2011), 13 pages.

"Non-Final Office Action", U.S. Appl. No. 12/098,254, (Jan. 14, 2011), 8 pages.

"Non-Final Office Action", U.S. Appl. No. 12/101,668, (Apr. 5, 2011), 7 pages.

"Non-Final Office Action", U.S. Appl. No. 12/178,268, (Dec. 22, 2010), 10 pages.

"PCT Partial Search Report", Application Serial No. PCT/US2008/078343, Partial International Search, (Mar. 5, 2009), 2 pages.

"PCT Search Report and Written Opinion", Application No. PCT/US2009/067767, (Mar. 26, 2010), 12 pages.

"PCT Search Report", Application No. PCT/US2009/056973, (Nov. 4, 2009), 13 pages.

"PCT Search Report", Application Serial No. PCT/US2008/078343, (May 18, 2009), 5 pages.

"Non-Final Office Action", U.S. Appl. No. 12/178,268, (Dec. 21, 2011), 13 pages.

"Non-Final Office Action", U.S. Appl. No. 12/271,761, (Oct. 3, 2011), 6 pages.

"Non-Final Office Action", U.S. Appl. No. 12/559,987, (Nov. 9, 2011), 10 pages.

"Non-Final Office Action", U.S. Appl. No. 12/636,558, (Jan. 10, 2012), 6 pages.

"Notice of Allowance", U.S. Appl. No. 12/098,254, (Dec. 14, 2011), 4 pages.

"Notice of Allowance", U.S. Appl. No. 12/098,254, (Sep. 28, 2011), 4 pages.

"Notice of Allowance", U.S. Appl. No. 12/271,761, (Jan. 3, 2012), 6 pages.

"Restriction Requirement", U.S. Appl. No. 12/101,668, (Sep. 22, 2011), 6 pages.

"Final Office Action", U.S. Appl. No. 12/101,668, (May 10, 2012), 8 pages.

"Foreign Office Action", European Patent Application No. 09803951.4, (May 24, 2012), 3 pages.

"Non-Final Office Action", U.S. Appl. No. 12/636,558, (May 29, 2012), 8 pages.

"Non-Final Office Action", U.S. Appl. No. 13/333,551, (Apr. 6, 2012), 5 pages.

"Notice of Allowance", U.S. Appl. No. 12/559,987, (Jun. 15, 2012), 5 pages.

"Notice of Allowance", U.S. Appl. No. 13/333,551, (May 30, 2012), 4 pages.

"Foreign Office Action", European Patent Application No. 09803951.4, Dec. 13, 2012, 6 pages.

"Foreign Office Action", Japanese Application No. 2011-544456, Jan. 29, 2013, 7 pages.

"Notice of Allowance", U.S. Appl. No. 12/636,558, Jan. 9, 2013, 4 pages.

"Notice of Allowance", U.S. Appl. No. 12/101,668, Jan. 11, 2013, 6 pages.

"Supplemental Notice of Allowance", U.S. Appl. No. 12/101,668, Feb. 8, 2013, 4 Pages.

"Foreign Office Action", Japanese Application No. 2011-527899, Nov. 6, 2012, 4 pages.

"Non-Final Office Action", U.S. Appl. No. 12/101,668, Aug. 9, 2012, 8 pages.

"Supplemental Notice of Allowance", U.S. Appl. No. 13/333,551, Oct. 23, 2012, 2 pages.

"EP Intent to Grant", European Patent Application No. 09803951.4, May 14, 2013, 13 Pages.

"Foreign Office Action", Japanese Application No. 2011-527899, Apr. 16, 2013, 5 pages.

"Non-Final Office Action", U.S. Appl. No. 13/863,079, Jun. 20, 2013, 10 pages.

"Non-Final Office Action", U.S. Appl. No. 13/657,511, Mar. 28, 2013, 13 pages.

* cited by examiner

(Prior Art)

FIG. 1

(Prior Art)

FIG. 2

(Prior Art)

(Prior Art)

FIG. 6

FIG. 7 ively filed U.S. provisional patent application Ser. No. 61/090,376,

EFFICIENT KEY ESTABLISHMENT FOR WIRELESS NETWORKS

CROSS-REFERENCE TO RELATED APPLICATIONS

This application claims the benefit of priority to previously filed U.S. provisional patent application Ser. No. 61/090,376, filed Aug. 20, 2008, entitled EFFICIENT KEY ESTABLISHMENT FOR WIRELESS NETWORKS; and of U.S. provisional patent application Ser. No. 61/090,380, filed Aug. 20, 2008, entitled EFFICIENT SECURITY FOR DISTRIBUTED NETWORK ENVIRONMENTS. Those provisional applications are hereby incorporated by reference in their entirety.

FIELD OF THE INVENTION

Aspects of the present invention relate generally to the field of network security, and more particularly to the exchange of keys between stations in a wireless network.

DESCRIPTION OF THE RELATED ART

In wireless local area networks (LANs), link layer security protocols may be based on the IEEE 802.11 specifications. Early security models such as Wired Equivalent Privacy (WEP), Temporal Key Integrity Protocol (TKIP) and Wi-Fi Protected Access (WPA) that were typically used to protect data sent between stations in a wireless network have been replaced with WPA2. The WPA2 protocol uses an Advanced Encryption Standard (AES) cipher with Counter Mode with Cipher Block Chaining Message Authentication Code Protocol (CCMP). WPA2 uses a four-way handshake to exchange unique nonce (number used once) pairs and establish a unique pairwise key for each pair of communicating stations.

A wireless LAN may utilize a variety of architectures. For example, a wireless LAN can be organized in a star topology with a central access point station communicating with several client stations. Each client station communicates directly only with the access point. Stations can be connected to a network via a network adapter or network interface card that manages the network communications and can provide a MAC address for the station. Alternatively, a wireless LAN can be organized with a basic service set (BSS). In a BSS topology, all the client stations communicate directly with each other. An independent BSS allows communication without use of an access point. Peer-to-peer networks or ad-hoc networks may be independent BSS networks. An infrastructure BSS allows communication between client stations on the BSS network and client stations not on the BSS network via an access point.

Independent Basic Service Set (IBSS) networks, mesh networks, and direct link setup networks in accordance with the IEEE 802.11z standard, may each use a WPA2 protocol to protect inter-station communications. The WPA2 security protocol used in an IBSS may be complicated by the need for unique key/nonce pairs for each pair of communicating stations. In such systems, where there may not be a central access point responsible for managing communication and security among the nodes of the network, secure communication requires that each station exchange a pair of keys with every other station with which the station communicates.

SUMMARY

A method and apparatus are provided for deriving an encryption key for use between two stations in a wireless network using information intrinsic to one of the stations, without exchanging pairwise transient keys. In some embodiments, the intrinsic information may be information provided in a beacon signal transmitted by one of the stations. In some embodiments, the intrinsic information may include the media access control (MAC) addresses of the stations. In some embodiments, infinite error detection may be used to verify the integrity of messages exchanged between the stations.

BRIEF DESCRIPTION OF THE DRAWINGS

The present invention is described herein with reference to the accompanying drawings, in which similar reference numbers are used to indicate functionally similar elements. The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Figure 1:
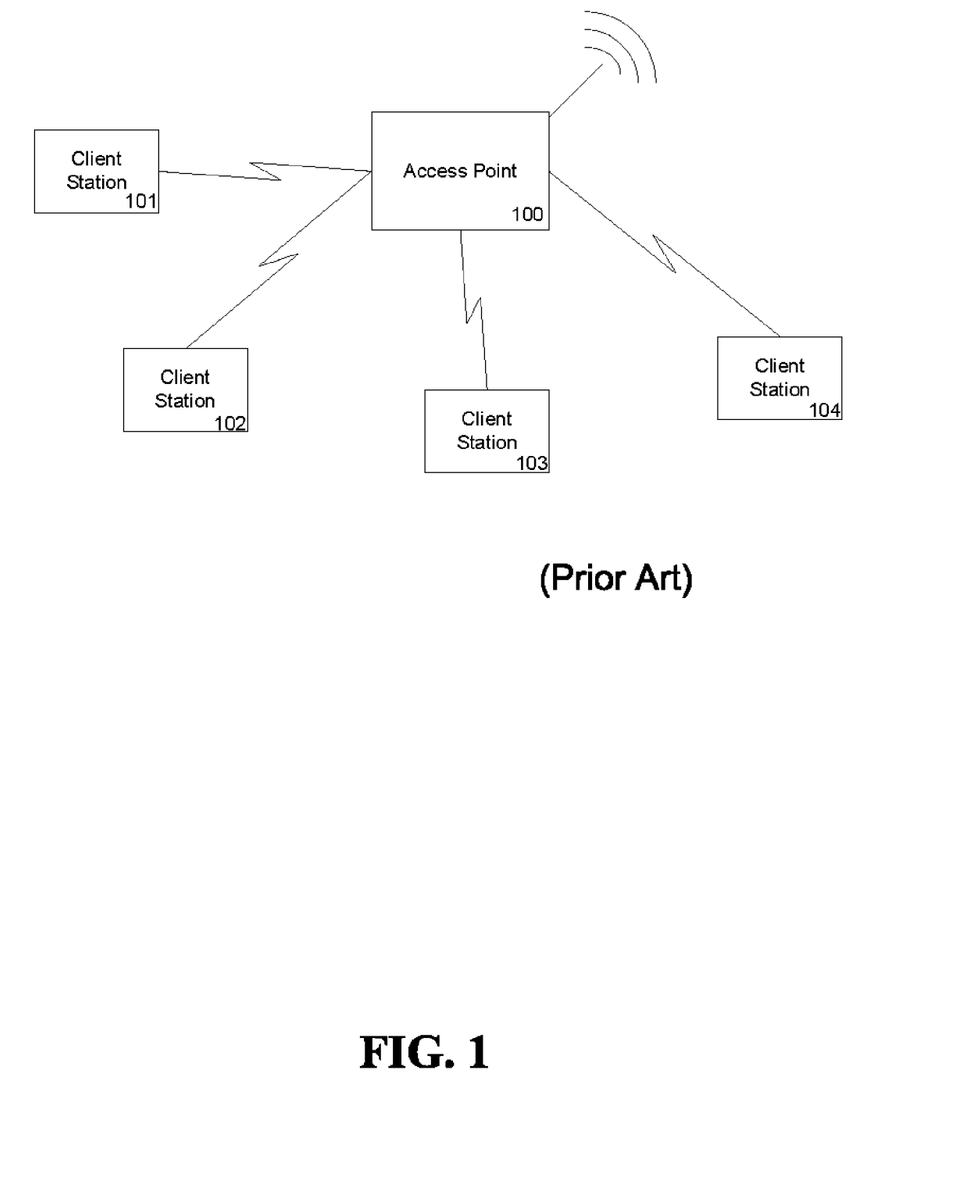
FIG. 1 shows a conventional star topology for a wireless network.

FIG. 1 shows a conventional star topology for a wireless network. Each client station 101-104 communicates with access point 100. Access point 100 functions as a gateway for a client station to a local area network (LAN) or to the Internet. Additionally, if client station 101 communicates with client station 102, the communication would be facilitated via access point 100. Once client station 101 begins communicating with access point 100, access point 100 initiates an authentication protocol to verify the identity of the access point to the client station. For example a variation of Extensible Authentication Protocol (EAP) can be used, which includes the exchange of a Pairwise Master Key (PMK). The PMK is unique for each access point/client station pair, but may be communicated sparingly in order to preserve the secrecy of the PMK.

To initiate secure communication between access point 100 and client station 101, additional security may be provided at the link layer and may involve the exchange of secure Pairwise Transient Keys (PTKs). AES-CCMP is an example of an encryption protocol used to exchange PTKs. The keys exchanged between access point 100 and client station 101 should be unique from the keys exchanged with client station 102. Therefore, access point 100 may exchange different keys with each client station.

Figure 3:
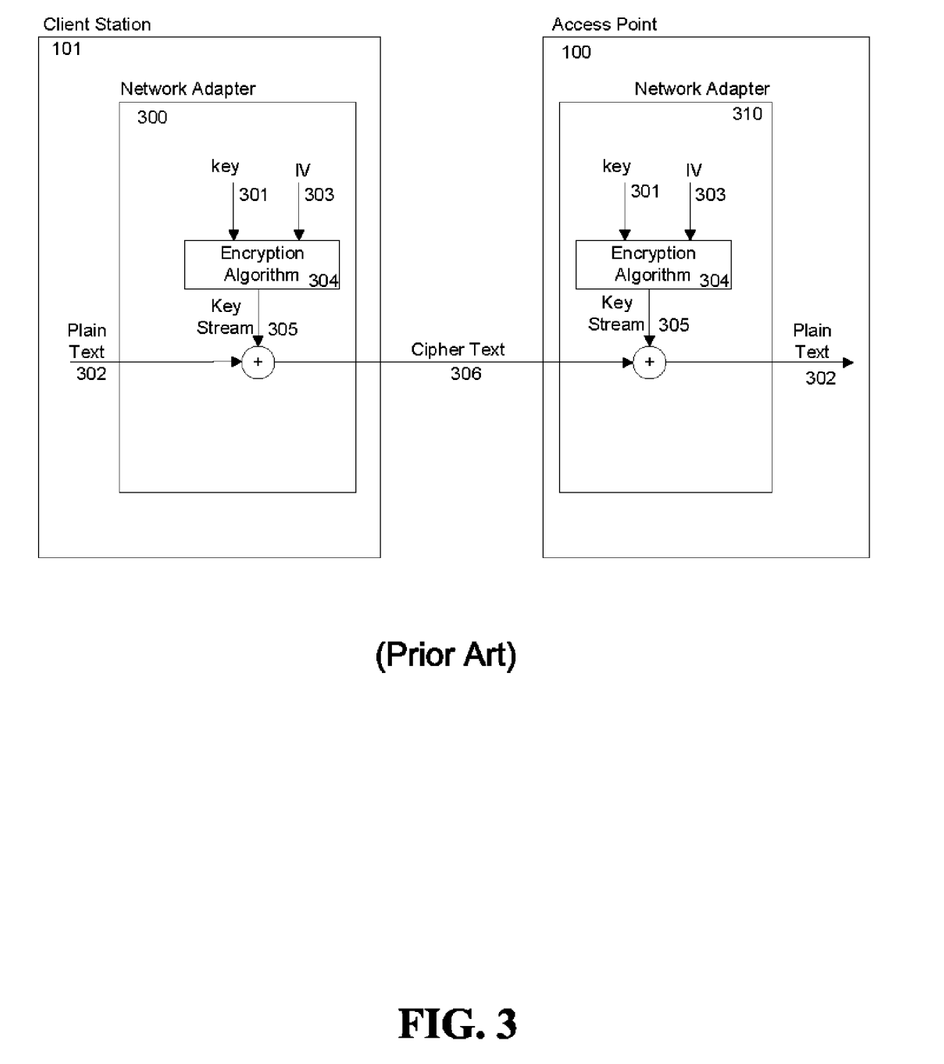
FIG. 3 shows a conventional exchange of encrypted data between an access point and a client station.

FIG. 3 shows a conventional exchange of encrypted data between two network adapters. Each station capable of communicating in a wireless network may implement a network adapter. A network adapter manages the network connection, provides a MAC address for the station, and implements an encryption algorithm to facilitate secure communications. As shown in FIG. 3, client station 101 includes a network adapter 300, and access point 100 includes a network adapter 310. Once the PTK has been established, data may be exchanged between network adapter 300 and network adapter 310. Network adapter 300 combines key 301 and initialization vector 303 with encryption algorithm 304, the output of such combination is key stream 305. Key stream 305 is XOR'd with plain text data 302 to create cipher text 306. Cipher text 306 is an encrypted message that may safely be sent to network adapter 310. Network adapter 310 similarly uses key 301, initialization vector 303, and encryption algorithm 304 to create key stream 305. Key stream 305 is then XOR'd with cipher text 306 to derive plain text data 302.

Key 301 may be the PTK established during the four-way handshake. Initialization vector 303 may be a unique value for each packet of data sent from network adapter 300 to network adapter 310. A unique initialization vector 303 for every packet ensures that key stream 305 is unique for every packet sent. If key stream 305 never varied, key stream 305 may be deciphered by intercepting multiple packets with similar plain text data. To accommodate a unique initialization vector, nonce values may be exchanged between stations.

Figure 2:
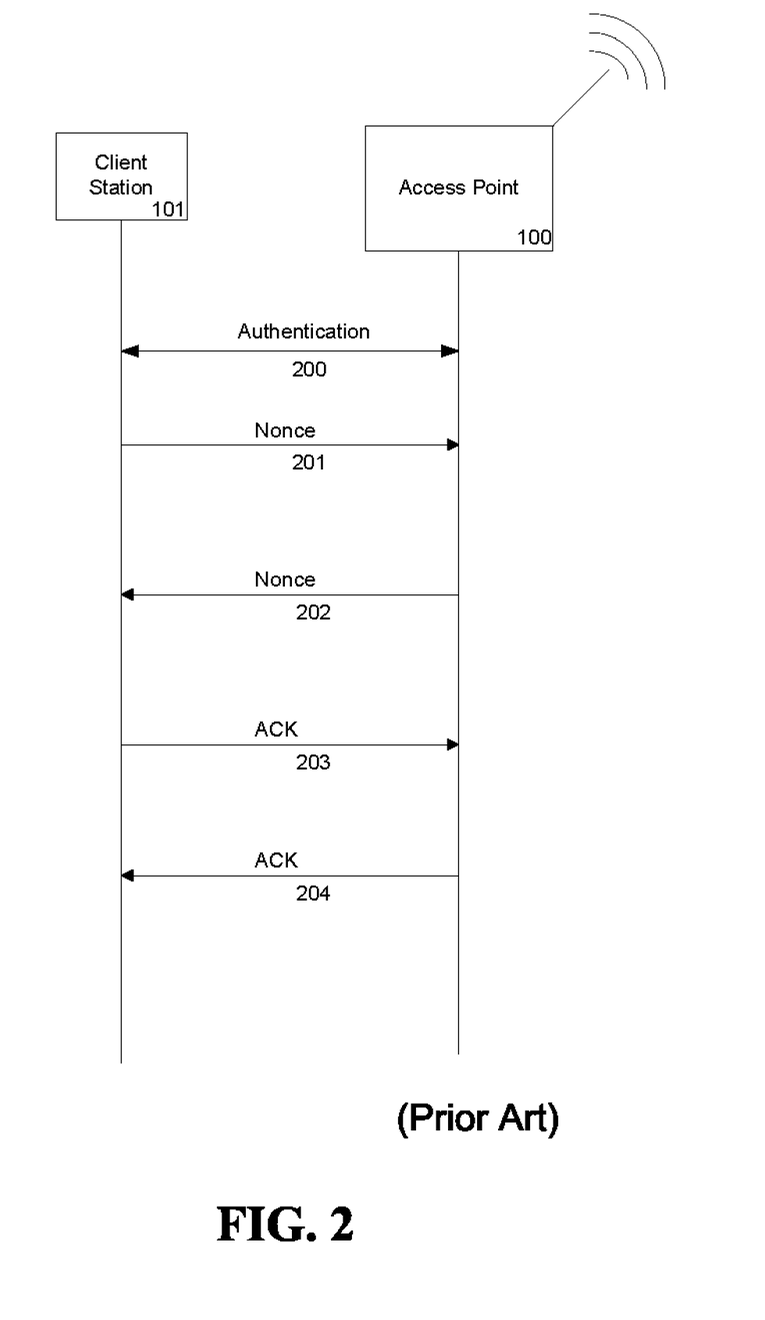
FIG. 2 shows a conventional key exchange using a four-way handshake between an access point and a client station.

FIG. 2 shows a conventional key exchange using a four-way handshake between access point 100 and client station 101. As previously noted, upon joining the network, client station 101 and access point 100 may engage in an authentication exchange 200 to authenticate the identity of client station 101. Then the four-way handshake may begin. Number used once (nonce) 201 and nonce 202 are exchanged. Once utilized, nonce 201 and nonce 202 may not be used in another four-way handshake by either station. Acknowledgment messages ACK 203 and ACK 204 are then exchanged. The four-way handshake exchange may occur between each pair of communicating stations in the network to ensure that an encryption key is unique for each client station/access point station pair.

A Pairwise Transient Key (PTK) may be derived using the earlier exchanged PMK, nonce 201, nonce 202, and the Media Access Control (MAC) addresses of communicating stations. Acknowledgement messages may additionally include a Group Temporal Key (GTK), which is a sequence number for use with the relay of broadcast messages, and a message integrity check (MIC) value. A MIC can be used to verify the integrity of the message and may additionally be exchanged with the nonce values. In some implementations, MIC is computed or derived from a hash function, for instance. If both client station 101 and access point station 100 calculate a MIC value, any discrepancy between the two calculated values can indicate that the message has been tampered with or has otherwise been altered. A GTK is a key that can be used by a broadcasting station to validate each broadcast transmission.

Figure 4:
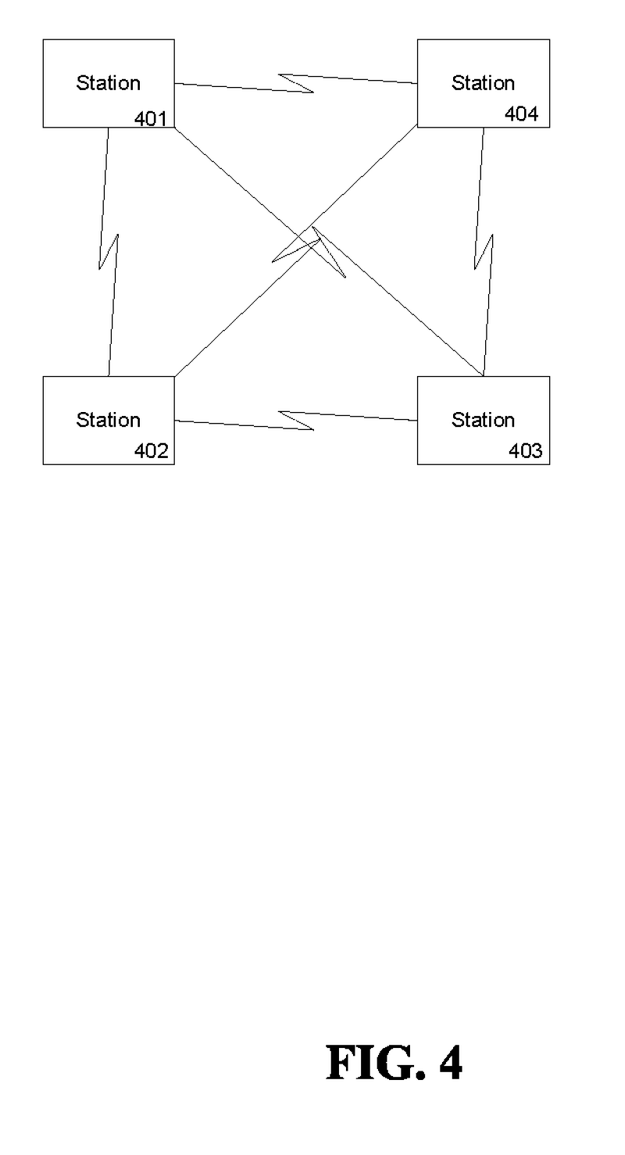
FIG. 4 shows one embodiment of a fully connected mesh network topology.

FIG. 4 shows one embodiment of a mesh network topology. A mesh network can be any ad hoc network in which the stations communicate directly with other stations without an access point managing the communications. In a fully connected mesh network, a station may be connected to every other station in the network, and any station may be connected to a LAN or to the Internet. As shown in FIG. 4, station 401 communicates directly with station 402, station 403, and station 404. Using traditional security protocols, in order to maintain secure communications, station 401 would need to exchange unique keys with every other station with which station 401 communicates, e.g., with station 402, 403, and 404. Then station 402 would need to exchange unique keys with every other station with which it communicates. If there are N stations in the network, the key exchange involves N*(N−1) exchanges, each exchange involving a four-way handshake. This exchange of unique keys may result in substantial overhead.

Figure 5:
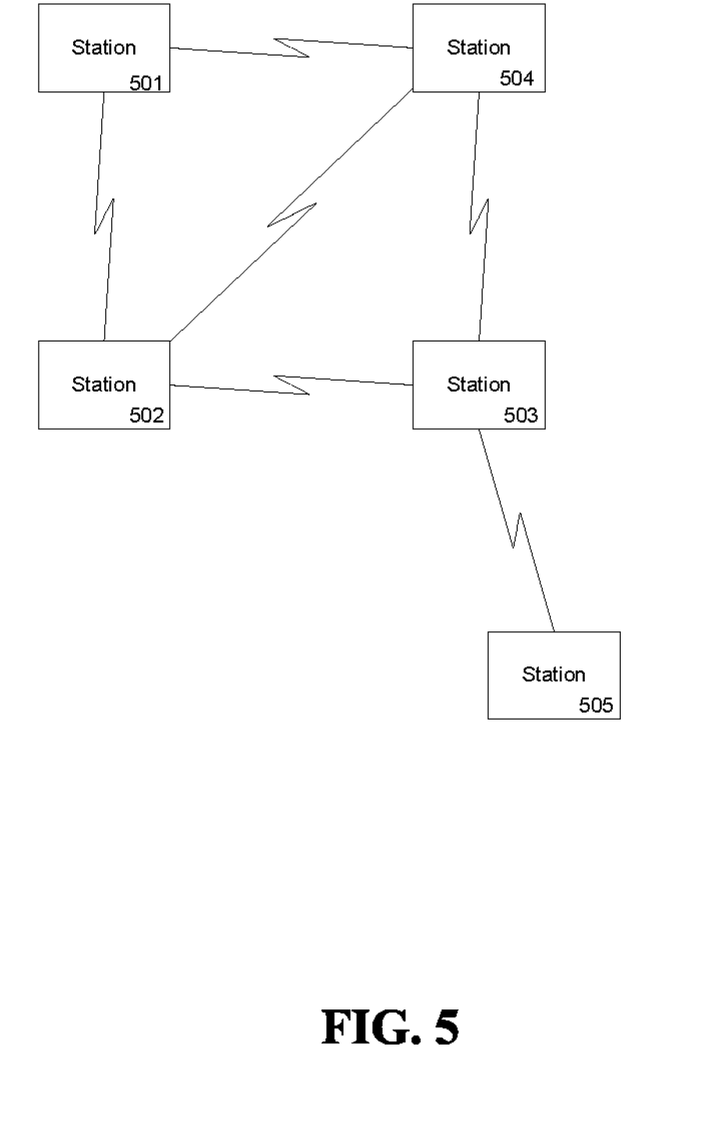
FIG. 5 shows one embodiment of an ad hoc mesh network that is not fully connected.

FIG. 5 shows one embodiment of an ad hoc mesh network that is not fully connected. Station 501 communicates directly with station 502 and station 504, but not station 503. Station 505 communicates directly with only station 503. As shown, the stations in the network are not able to communicate directly with every other station in the network, but are capable of indirect communication via one or more additional stations. For example, communication between station 501 and station 505 may be relayed through station 503 and station 504. Each station then only needs to exchange encryption keys with those stations in the network with which direct communication is possible. Station 503 can exchange encryption keys with station 502, station 504 and station 505, but not station 501. Although less than N*(N−1) exchanges are needed to facilitate secure communication in the network, each key exchange still involves a four-way handshake, resulting in substantial overhead. An independent BSS network or a direct link setup network may also be organized using a mesh network topology.

In a mesh network involving broadcast or multicast of messages, significant difficulties arise over the exchange of unique keys. Each broadcasting station may have a unique GTK that may be exchanged with every station capable of receiving a broadcast message. A station added to an ad hoc network may not be able to receive broadcast messages until it has exchanged a GTK with the broadcasting station. The GTK may change with every addition or removal of a station in the mesh network, which may require an update of the GTK at every station in the network, each update involving a handshake between communicating stations. The exchange and update of the GTK therefore may involve substantial overhead.

Encrypting data without the explicit exchange of unique keys eliminates some of the overhead inherent in the unique key exchange between stations in a mesh network. Additionally, allowing stations to receive broadcast messages without first requiring an explicit exchange of keys can decrease overhead time by allowing more efficient broadcast communication. To maintain security without an explicit exchange of information, data can be encrypted using keys derived from intrinsic information known within the stations.

In one embodiment, a station communicates with other stations in the network via a network adapter or network interface card. The network adapter comprises an encryption module. The encryption module can be implemented in hardware, such as memory registers, buffers, or other memory structures, or in software or other hardware executable instructions. The encryption module has access to information intrinsic to the station. Intrinsic information can be any information known within the station, or obtainable by the station, that is not obtained with the traditional four-way handshake.

In one embodiment, intrinsic information used to derive an encryption key includes information included in a beacon message. A beacon message is a packet that is typically sent to alert stations in an ad hoc network that a new station has been added to the network. Information for portions of a unique key to secure communications with the station that transmitted the beacon can be derived from information included in the beacon.

In one embodiment, a unique key is established between station 501 and station 502 using the standard four-way handshake, then implicit knowledge of additional devices communicating with station 501, for example station 504, is used to establish a unique key between station 502 and station 504. The derivation of a key based on prior communications between stations can be facilitated with the use of the implicit knowledge within station 501 of the MAC addresses of the stations with which station 501 communicates.

In one embodiment, key derivation and exchange is simplified. For example, a unique key is established with the exchange of a single nonce value, rather than two separate nonce values. The data packet exchanged between stations containing the nonce value includes additional sequence space in the packet header. The sequence space may be used in combination with the single nonce value to calculate a unique key.

In one embodiment, the use of an infinite error extension mode eliminates the need for unique key pairs. Infinite error extension used to derive a MIC value included in the encrypted transmission allows for secure communication and authentication without the use of unique pairs, as any error in the message will be known.

Figure 6:
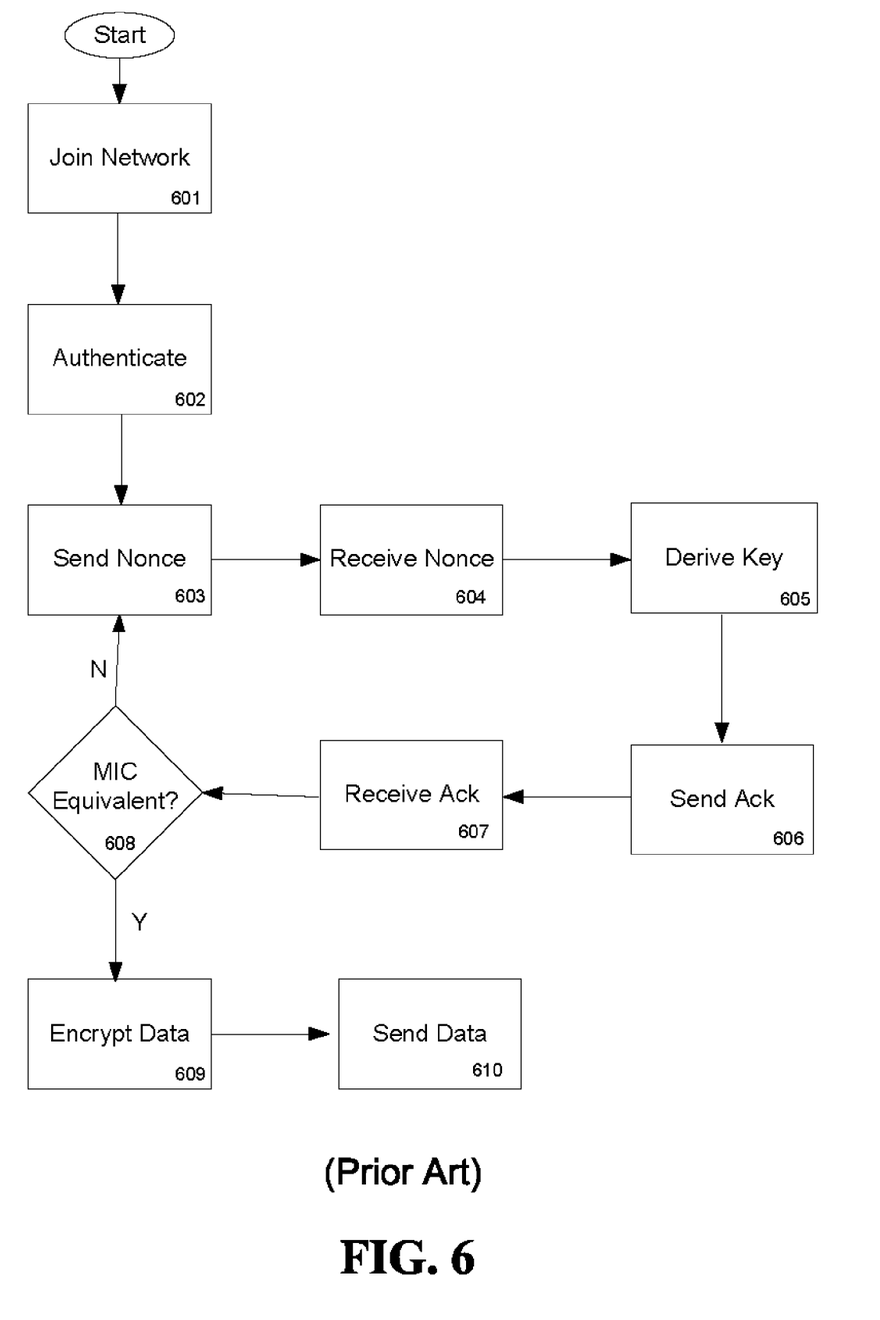
FIG. 6 is a simplified flow diagram illustrating general operation of a traditional method of exchanging secure keys and communicating encrypted data in a wireless network.

FIG. 6 is a simplified flow diagram illustrating general operation of a traditional method of exchanging secure keys and communicating encrypted data in a wireless network. With reference also to FIG. 2, it will be appreciated that aspects of the method illustrated in FIG. 6 may generally be conducted by one or more components of client station 101 depicted at the left of FIG. 2. The exchange of encryption keys to facilitate secure communication of data can begin when a station (such as station 101) joins a wireless network at block 601. Upon joining the network, an authentication protocol is initiated at block 602 to verify the identity of the station. A nonce value is sent at block 603. The nonce value can be used as a first unique initialization vector with the encryption key and an encryption algorithm to protect data confidentiality. At block 604 a second nonce value is received. A key is derived at block 605 using both nonce values. An acknowledgment message is sent at block 606; the acknowledgement message comprises a message integrity check value. An acknowledgment message is received at block 607. If the received acknowledgment message contains a message integrity check, and a message integrity check calculated with the second acknowledgment message are not equivalent at decision block 608, then an error may have occurred during the transmission of nonce values or acknowledgement messages, and the exchange may be again attempted. If at decision block 608 the received and calculated message integrity check values are equivalent, the pairwise transient keys have been successfully exchanged and transmission data can be effectively encrypted at block 609. An exchange of data then occurs at block 610.

Figure 7:
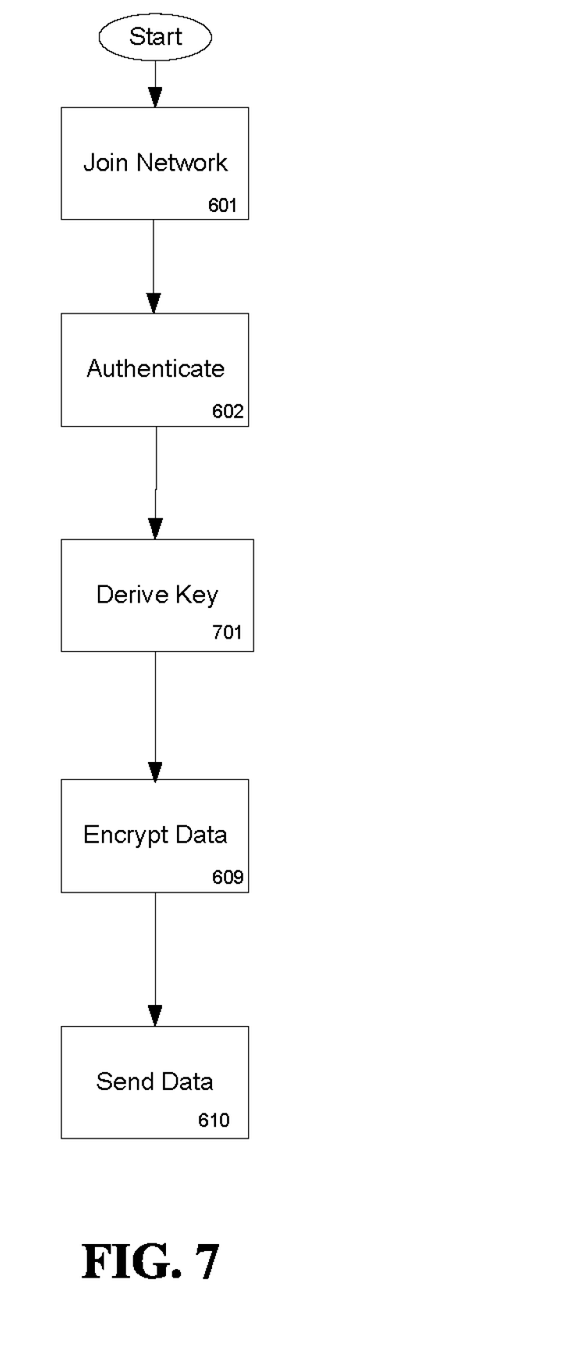
FIG. 7 is a simplified flow diagram illustrating general operation of one embodiment of a method of establishing secure keys with intrinsic information and exchanging encrypted data in a wireless network.

FIG. 7 is a simplified flow diagram illustrating general operation of one embodiment of a method of establishing secure keys with intrinsic information and exchanging encrypted data in a wireless network. The exchange of encryption keys to facilitate secure communication of data may be unnecessary when intrinsic information is used to derive an encryption key. The derivation of an encryption key can be initiated when a station joins a wireless network at block 601. Upon joining the network, an authentication protocol is initiated at block 602 to verify the identity of the new station. To initiate communication with the new station, a network station first derives an encryption key. The key is derived at block 701 using information already known in, or intrinsic to the initiating station. This intrinsic information can be some combination of station MAC addresses, data exchanged during authentication, data contained in a beacon message used to announce the addition of the new station to the network, etc. If both the receiving and communicating stations have access to the intrinsic data, and both stations use the same algorithm to derive the keys, then communication between the stations may be secure. Once an encryption key has been derived, transmission data can be effectively encrypted (at block 609) and an exchange of data can then occur (at block 610) generally as set forth above.

It is noted that the arrangement of the blocks in FIG. 7 does not necessarily imply a particular order or sequence of events, nor is the arrangement intended to exclude other possibilities. For example, the operations depicted at 602 and 701 may occur substantially simultaneously with each other; similarly, the operation occurring at block 602 may be eliminated in some instances.

Although the above embodiments were described primarily as applicable to a mesh network, the embodiments may be effectively utilized in any wireline or wireless network that conventionally uses an exchange of unique key pairs to encrypt secure data, including an IBSS network, an smesh network, a DLS network, or a conventional network based on a star topology with an access point and client stations.

While the invention has been described in detail above with reference to some embodiments, alternative implementations and various modifications are within the scope of the present disclosure. Therefore, the invention should be considered as limited only by the scope of the appended claims.

What is claimed is:

1. A method comprising:
   establishing a unique key between a first network station and a second network station to enable the second network station to join a wireless network, the first network station configured to communicate with at least a third network station in the wireless network; and
   deriving an encryption key, by the second network station, to communicate with the third network station, the deriving based on information intrinsic to the third network station that is received at the second network station from the first network station, the information intrinsic to the third network station implicitly known by the first network station based on prior communications between the first network station and the third network station over the wireless network, wherein the information intrinsic to the third network station is known by the second network station without exchanging pairwise transient keys between the second network station and the third network station.

2. The method of claim 1, wherein the information intrinsic to the third network station is obtained by the second network station from a beacon signal transmitted by the first network station.

3. The method of claim 1, wherein the information intrinsic to the third network station is obtained by the second network station from a first data packet exchanged between the first network station and the second network station.

4. The method of claim 1, further comprising implementing infinite error detection to derive a message integrity check (MIC) value.

5. The method of claim 4, wherein the implementing infinite error detection comprises utilizing a hash function to compute the MIC value.

6. The method of claim 4, further comprising comparing the MIC value with a value received from the first network station.

7. The method of claim 1 wherein the information intrinsic to the third network station comprises a media access control (MAC) address of the third network station.

8. A network adapter implemented at a network station, the network adapter comprising:
  a memory comprising hardware-executable instructions to execute an encryption module to derive an encryption key from a first additional network station in a wireless network to communicate with a second additional network station in the wireless network, wherein the encryption module is configured to derive the encryption key from information intrinsic to the second additional network station that is implicitly known by the first additional network station based on prior communications between the first additional network station and the second additional network station in the wireless network, and wherein the information intrinsic to the second additional network station is known by the network adapter without exchanging pairwise transient keys with the second additional network station.

9. The network adapter of claim 8, wherein the information intrinsic to the second additional network station is obtained by the network adapter from a beacon signal transmitted from the first additional network station.

10. The network adapter of claim 8, wherein the information intrinsic to the second additional network station is obtained by the network adapter from a first data packet exchanged with the first additional network station.

11. The network adapter of claim 8, wherein the information intrinsic to the second additional network station comprises a media access control (MAC) address of the second additional network station.

12. The network adapter of claim 8, wherein the encryption module implements infinite error detection to derive a message integrity check (MIC) value.

13. The network adapter of claim 12, wherein the MIC value is computed using a hash function.

14. The network adapter of claim 12, wherein the encryption module compares the MIC value with a value received from the first additional network station.

* * * * *